United States Patent [19]

Sequin

[11] 3,801,827

[45] Apr. 2, 1974

[54] MULTIPLE-PHASE CONTROL SIGNAL GENERATOR

[75] Inventor: Carlo Heinrich Sequin, Summit, N.J.

[73] Assignee: Bell Telephone Laboratories Incorporated, Murray Hill, N.J.

[22] Filed: Oct. 5, 1972

[21] Appl. No.: 295,369

[52] U.S. Cl. ................ 307/223, 307/221 C, 328/43
[51] Int. Cl. ........................................... H03k 21/00
[58] Field of Search........ 307/260, 205, 251, 221 C, 307/223; 328/37, 43

[56] References Cited

UNITED STATES PATENTS

| | | | |
|---|---|---|---|
| 3,548,203 | 12/1970 | Basse | 307/223 |
| 3,593,032 | 7/1971 | Ma | 307/221 C |
| 3,054,059 | 9/1962 | Ingerman | 328/43 |
| 3,105,195 | 9/1963 | Tarchzy-Hornoch | 328/43 |
| 3,235,796 | 2/1966 | Tarchzy-Hornoch | 328/43 |
| 3,614,580 | 10/1971 | Eto | 307/223 |
| 3,665,304 | 5/1972 | Maybach | 324/85 |
| 3,431,433 | 3/1969 | Ball | 307/221 C |

*Primary Examiner*—Rudolph V. Rolinec
*Assistant Examiner*—Ro E. Hart
*Attorney, Agent, or Firm*—G. W. Houseweart; I. Ostroff

[57] ABSTRACT

A plurality of flip-flops are serially connected into a ring by switches which are controlled by a one-phase clock pulse and its logical complement. In response to the one-phase clock pulses there are produced multiple-phase control signals with controllable partial overlap of successive phases. The overlap is equal to the width of the one-phase clock pulse. The apparatus is especially useful for providing three-phase clock pulses for driving charge coupled devices and is readily integrable in the form of standard logic gates.

8 Claims, 8 Drawing Figures

FIG. 1
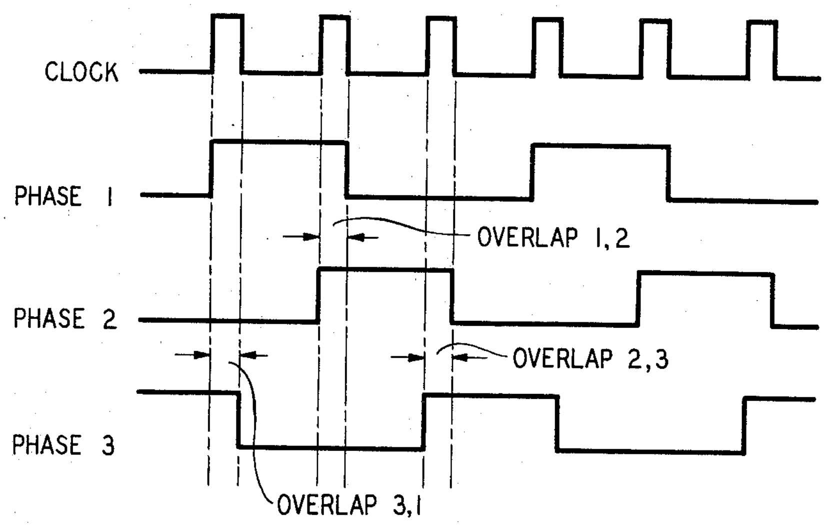
FIG. 2A
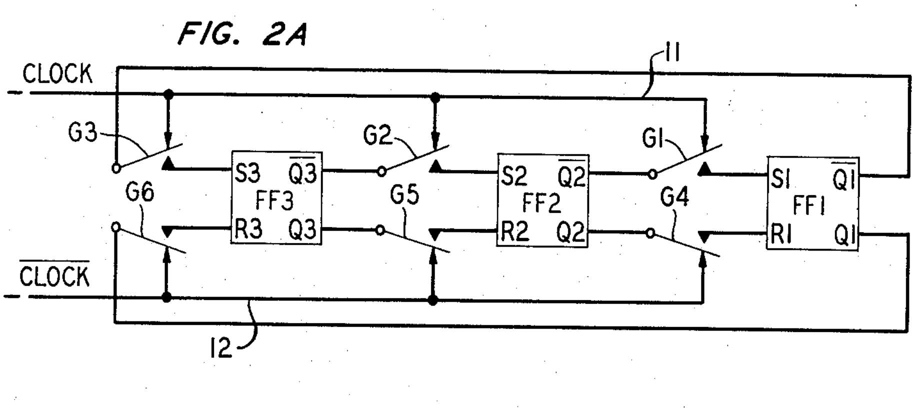
FIG. 2B
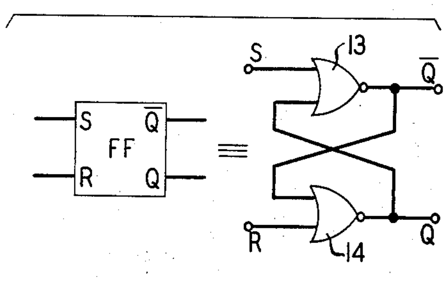
FIG. 2C
NOR-GATE FLIP-FLOP
TRUTH TABLE
| R | S | Q | $\overline{Q}$ | |
|---|---|---|---|---|
| 0 | 0 | X | X | ← DEPENDS ON HISTORY |
| 0 | 1 | 1 | 0 | |
| 1 | 0 | 0 | 1 | |
| 1 | 1 | 0 | 0 | |

NAND-GATE FLIP-FLOP
TRUTH TABLE

| R | S | Q | $\overline{Q}$ |
|---|---|---|---|
| 0 | 0 | 1 | 1 |
| 0 | 1 | 1 | 0 |
| 1 | 0 | 0 | 1 |
| 1 | 1 | X | X |

← DEPENDS ON HISTORY

MULTIPLE-PHASE CONTROL SIGNAL GENERATOR

BACKGROUND OF THE INVENTION

This invention relates to apparatus for generating multiple-phase control signals in response to a one-phase clock signal and, more particularly, to such apparatus adapted for providing controllable partial overlap of successive phases of the multiple-phase control signals equal to the width of the one-phase clock signals.

A great variety of modern electronic apparatus employs multiple-phase control signals. One such type of apparatus of considerable present interest is the three-phase charge coupled device, described, for example, in IEEE Spectrum, July 1971, pages 18 through 27. In such devices it is desirable for efficient and predictable operation that successive phases overlap in time by a determinable amount, which amount preferably is adjustable.

It is conventional to generate multiple-phase control signals, including ones with overlap of successive phases, through use of combinational logic gates interconnected with successive outputs of a ring counter. An example of such apparatus is disclosed in U.S. Pat. No. 3,539,938, issued Nov. 10, 1970, to G. L. Heimbigner. Known forms of such apparatus suffer, however, from the disadvantage that the amount of overlap of the multiple-phases is fixed by the wiring of the logic circuitry.

SUMMARY OF THE INVENTION

It is an object of this invention to provide an improved multiple-phase control signal generator wherein successive phases overlap in time by a determinable amount.

More specifically, an object of this invention is to provide apparatus for generating multiple-phase control signals wherein the determinable amount of successive phase overlap is determined by the width of a one-phase driving clock.

To these and other ends, multiple-phase control signal generating apparatus in accordance with this invention includes a plurality of flip-flops serially connected into a ring by switches which are controlled by a one-phase clock pulse and by the logical complement of the one-phase clock pulse. In response to the one-phase clock pulses, multiple-phase control signals with at least partial overlap of successive phases equal to the width of the one-phase clock pulse are produced.

More specifically, for generating three-phase control signals, the apparatus includes three flip-flops interconnected into a ring, wherein each flip-flop includes set and reset input means and first and second output means representative of the logic state and the complement of the logic state of the flip-flop. Each output of each flip-flop in the ring is coupled through one of a plurality of switches to a corresponding input of the succeeding flip-flop in the ring. The switches are controlled by a one-phase clock signal and its logical complement, causing the ring of flip-flops to change state at the beginning of each one-phase clock pulse and also at the end thereof.

BRIEF DESCRIPTION OF THE DRAWING

The foregoing and other objects, features, and advantages of the invention and the invention in general will be more clearly understood from the following detailed description taken in conjunction with the accompanying drawing, in which:

FIG. 1 is a waveform diagram depicting one-phase driving clock signals and partially overlapped three-phase control signals derived therefrom in accordance with this invention;

FIG. 2A is a block diagram of a three-phase control signal generator in accordance with this invention;

FIGS. 2B and 2C indicate a flip-flop specifically including NOR gates and an appropriate truth table therefor;

DETAILED DESCRIPTION

Figure 2D:
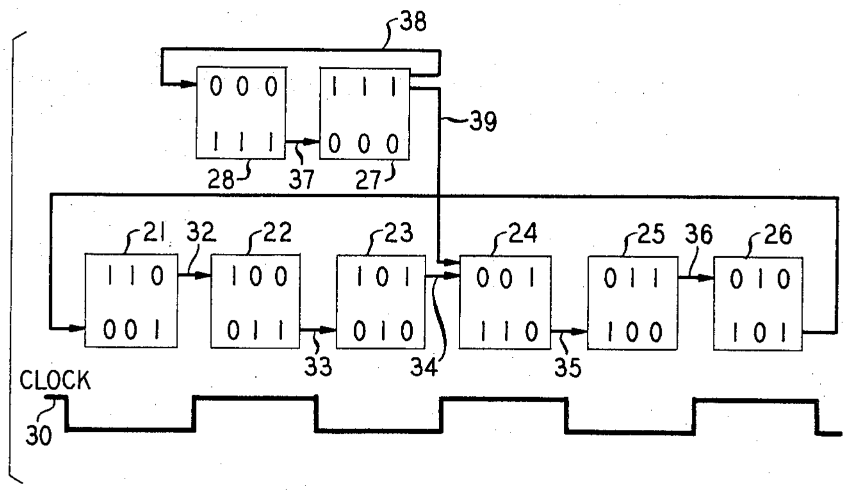
FIG. 2D depicts, primarily, the logic states corresponding to successive multiple-phases which are made to occur in the apparatus of FIG. 2A.

With more specific reference now to the drawing, FIG. 1 is a waveform diagram depicting a one-phase driving clock signal waveform and partially overlapped three-phase control signals derived therefrom in accordance with this invention. As can be seen, the trailing portion of a "PHASE 1" pulse overlaps the leading portion of the successive "PHASE 2" pulse by an amount indicated "OVERLAP 1,2;" the trailing portion of that "PHASE 2" pulse overlaps the leading portion of the successive "PHASE 3" pulse by an amount indicated "OVERLAP 2,3;" and the trailing portion of a "PHASE 3" pulse overlaps the leading portion of a "PHASE 1" pulse by an amount indicated "OVERLAP 3,1."

Control signal waveforms of the above-described general type are known to be suitable for use in driving three-phase charge coupled devices. In such uses the degree of desired overlap may vary from virtually zero to a substantial fraction of the pulse length of each phase, depending on the frequency performance of driver circuits used to amplify the logic voltages, e.g., 5 volts, to suitable three-phase drive voltages, e.g., 20 volts, and further depending on the transfer characteristics of the driven charge coupled device.

For generating three-phase control signals of the type depicted in FIG. 1 in response to one-phase clock signals, FIG. 2A is a block circuit diagram of a three-phase control signal generator in accordance with this invention. As can be seen, the generator includes three flip-flops, designated FF1, FF2, and FF3, connected into a closed cascade, i.e., a ring, by a plurality of switches G1–G6. In conventional fashion, each flip-flop has set and reset input terminals labeled S and R, respectively, and first and second output terminals Q and $\bar{Q}$ on which are output signals representative respectively of the logic state and the complement of the logic state of the flip-flop. Switches G1–G3 are controlled in common simultaneously by CLOCK signals coupled thereto via a connection path 11. Switches G4–G6 are controlled in common simultaneously by the complement, designated $\overline{\text{CLOCK}}$, the aforementioned CLOCK signals coupled thereto via a conduction path 12.

If the flip-flops are constructed with a pair of cross-connected NOR gates, e.g., gates 13 and 14 shown in FIG. 2B, the truth table for such a flip-flop is as shown in FIG. 2C. Because a NOR gate by definition has the property that its output is a logical "one" only if both inputs are logical "zeros," a NOR gate flip-flop of the type shown in FIG. 2B has the characteristic that a logical "one" at any input forces the associated output to a logical "zero." By "associated output" is meant that output, Q or $\overline{Q}$, which is also the output of the NOR gate to which the input in question is connected. For example, in FIGS. 2A and 2B, $\overline{Q}$ is the output associated with the S, or set input, and Q is the output associated with R, or reset input.

It should be noted, as indicated in FIG. 2C, that because the simple flip-flop of FIG. 2B is comprised only of simply cross-connected NOR gates, outputs Q and $\overline{Q}$ are not complementary for all possible input combinations because logical "ones" on both inputs force both outputs to be "zero." Also, logical "zeros" on both inputs do not produce a unique, predeterminable output. Rather, logical "zeros" on both inputs of the flip-flop produce an output which depends on the immediately pre-existing state (history) of the flip-flop.

Considering now the operation of the generator of FIG. 2A, switches G1–G6 are adapted to be normally open and to be closed only during the time a pulse is applied thereto. It is assumed that logic levels and pulse levels are such that an open switch is equivalent to application of a "zero" to the respective flip-flop input connected thereto. Also, for convenience and clarity of description, the presence of a pulse on CLOCK line 11 or on $\overline{\text{CLOCK}}$ line 12 and a logical "one" all will be referred to herein as a "high" level. In contrast, the absence of a pulse on lines 11 or 12 and a logical "zero" all will be referred to as a "low" level.

In operation, the signals present at outputs Q1–Q3 will be considered to be phases one to three, respectively, of the desired multiple-phase output. As defined, then, a logical "one" at any output Q1-Q3 will constitute a high or pulsed level for the respective phase; and a logical "zero" will represent a low or absence of a pulse.

It will be appreciated, of course, that the foregoing conventions and definitions are primarily to promote clarity and convenience of exposition and are purely arbitrary and could be defined otherwise.

With these considerations in mind, if no clock pulse is present on CLOCK line 11, a pulse is, by definition, present on $\overline{\text{CLOCK}}$ line 12; and switches G4–G6 are closed. Since the flip-flops of FIG. 2A are, for the purpose of this description, comprised of NOR gates, not more than one output Q, i.e., Q1, Q2, or Q3, can be at a "high" or "one" level. This is because a "one" at the R input of any of the flip-flops forces the output Q associated therewith to a "zero." Since only one output Q can be a "one" at this time, the outputs $\overline{Q}$ associated with the other two flip-flops must be "ones." For example, assuming Q1 is a "one," then Q2 and Q3 are "zero;" and $\overline{Q1}$ is "zero;" $\overline{Q2}$ is "one;" and $\overline{Q3}$ is "one."

From this condition, when a clock pulse subsequently is applied to CLOCK line 11, switches G1–G3 close and switches G4–G6 open. When this occurs, the "one" at $\overline{Q3}$ is coupled through closed switch G2 to input S2 of FF2, causing FF2 to change state, i.e., $\overline{Q2}$ changes to "zero." No other changes of state occur. Accordingly, at this time, and for the duration of this clock pulse, Q1 and Q2 both are "one;" Q3 is "zero;" $\overline{Q1}$ and $\overline{Q2}$ are both "zero;" and $\overline{Q3}$ is "one." Note, then, that for the duration of this clock pulse Q1 and Q2 both are "one," thus giving an overlap of "PHASE 1" and "PHASE 2."

From this overlap condition, when the clock pulse is removed, switches G4–G6 close and switches G1–G3 open. When this happens, the "one" at Q2 is coupled to input R1 of flip-flop FF1, causing FF1 to change state. Then, Q1 and Q3 are "zero;" Q2 is "one;" $\overline{Q1}$ and $\overline{Q3}$ are "one;" and $\overline{Q2}$ is "zero." Thus, in going from a "PHASE 1" output pulse to a "PHASE 2" output pulse, there was an overlap, indicated "overlap 1,2" in FIG. 1, of the trailing portion of "PHASE 1" and the leading portion of "PHASE 2," the overlap being equal to the width of the one-phase clock pulse. It will be appreciated that in the limit the overlap between successive phases can approach 50 percent as the duty cycle of the one-phase clock approaches 100 percent.

In view of the foregoing, subsequent logic states of the generator of FIG. 2A in response to subsequent pulses of the one-phase driving clock signal will become apparent through similar analysis of the effects of successive application and removal of the subsequent clock pulses. In particular, such analysis shows that application and removal of three clock pulses excites the generator through six unique states; and that further pulses cause cyclical repetition of those six states.

For the sake of completeness, FIG. 2D depicts primarily those six states in rectangles labeled 21–26. In each rectangle, the top row of three numbers taken from left to right indicate, respectively, $\overline{Q3}$, $\overline{Q2}$, and $\overline{Q1}$ for the generator of FIG. 2A; and the bottom row indicates, respectively, Q3, Q2, and Q1. Thus, for example, rectangle 21 represents the first of the above-described states, in which $\overline{Q3}$, $\overline{Q2}$, and Q1 are "one" and $\overline{Q1}$, Q3, and Q2 are "zero." In like manner, rectangle 22 represents the second of the above-described states, in which $\overline{Q3}$, Q2, and Q1 are "one" and $\overline{Q2}$, $\overline{Q1}$, and Q3 are "zero."

Also in FIG. 2D, waveform 30 represents a one-phase clock signal waveform, aligned with rectangles 21–26 to indicate the respective half-phase on which each of the six states occur. A plurality of arrows 31–36, separate ones leading from each rectangle to the next, indicate by their alignment with a particular row of numbers in each rectangle which set of switches, i.e., G1–G3 or G4–G6, are active in the transition to the state represented in the rectangle to which each arrow is directed.

As an example of the information derivable from FIG. 2D, rectangle 24 indicates the "overlap 2,3" condition since Q3 and Q2 are "one." Clock waveform 30 is high under rectangle 24, which in combination with arrow 34 being aligned with the top row of rectangle 24, indicates that the state represented in rectangle 24 occurs when a clock pulse is present; and, accordingly, the transition thereto occurs with G1–G3 closed and G4–G6 open.

In general, now, analysis of the foregoing, especially FIG. 2D, indicates that as long as a clock pulse is present, two outputs Q are at a high level; and, thus, the corresponding two pulses overlap. Only when a clock pulse returns to logical "zero" is the overlapping phase turned off. Thus, it is clear that the overlap of phases is equal to the widths of the one-phase driving clock pulses, which, of course, are adjustable at will.

With reference again to FIG. 2D, there are also depicted a pair of rectangles 27 and 28, interconnected by arrows 37 and 38, which represent "wrong states," i.e., an undesired sequence of states into which a generator constructed of simply cross-connected NOR gates can fall during turn-on or due to an electrical disturbance. Although this undesired sequence can be broken simply by turning off the generator and restarting it one or more times, the possibility of falling into such a sequence can be avoided completely by, among other ways, including an additional feedback branch adapted to inhibit FF1 from changing state upon arrival of a clock pulse if output $\overline{Q3}$ is at a high level, i.e., if $\overline{Q3}$ is a "one." Such feedback is illustrated in and will be described hereinbelow with respect to the specific embodiments of FIGS. 3 and 4A.

Figure 3:
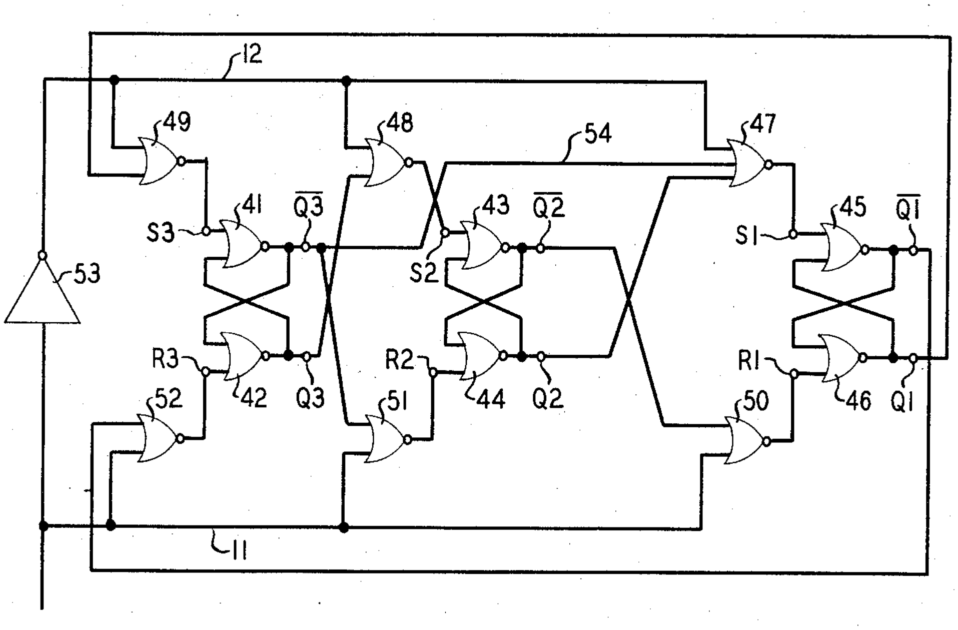
FIG. 3 depicts a three-phase control signal generator of the type shown in FIG. 2A but specifically including NOR gates for the flip-flops and the controllable switches.

With reference now to FIG. 3, there is depicted a three-phase control signal generator of the type shown in FIG. 2A but specifically including NOR gates for the flip-flops and the controllable switches. As seen, a pair of simply cross-connected NOR gates 41 and 42 comprise flip-flop FF3, having set and reset inputs S3 and R3 and outputs Q3 and $\overline{Q3}$. Another pair of simply cross-connected NOR gates 43 and 44 comprise flip-flop FF2, having set and reset inputs S2 and R2 and outputs Q2 and $\overline{Q2}$. A third set of simply cross-connected NOR gates 45 and 46 comprise flip-flop FF1, having set and reset inputs S1 and R1 and outputs Q1 and $\overline{Q1}$.

In FIG. 3, NOR gates 47–49 provide the function described with respect to controllable switches G1–G3 in FIG. 2A; and NOR gates 50–52 provide the function described with respect to controllable switches G4–G6 in FIG. 2A. However, in contradistinction to the connection of switches G1–G3, gates 47–49 are connected between the Q outputs and the set inputs, not between $\overline{Q}$ outputs and the set inputs. Likewise, in contradistinction to switches G4–G6, gates 50–52 are connected between the $\overline{Q}$ outputs and the reset inputs, not between the Q outputs and the preset inputs. These differences are solely becuase in operation NOR gates 47–52 operate as logically inverting switches; and so the connection to the appropriate complementary logic output simply is reversed. Also, because gates 47–52 operate as inverting switches, CLOCK line 11 is coupled in common to gates 50-52 and $\overline{\text{CLOCK}}$ line 12 is coupled to gates 47–49. Element 53 operates simply as an inverter to produce the $\overline{\text{CLOCK}}$ signals.

In operation, NOR gates 47–49 and 50–52 function as closed, inverting switches when the $\overline{\text{CLOCK}}$ or CLOCK line, respectively, coupled thereto, is at a low level. With this in mind, operation of the generator of FIG. 3 will be readily understood simply by analogy to the above-described operation of the generator of FIG. 2A. Only one additional feature of FIG. 3 need be described in detail. That is the fact, as seen in FIG. 3, that NOR gate 47, unlike NOR gates 48–52, includes three input terminals, one being connected to $\overline{\text{CLOCK}}$ line 12, one being connected to Q2, and the third input being connected to $\overline{Q3}$ through a conduction path 54. This third connection, i.e., to $\overline{Q3}$, provides the feedback referred to hereinafter for preventing undesired sequences of states. As was described hereinabove, a logical "one" at any input of a NOR gate forces the output of that gate to be "zero;" and, accordingly, if output $\overline{Q3}$ is at high level, i.e., a "one," FF1 is prevented from changing state upon arrival of a CLOCK pulse, on line 11, i.e., removal of a $\overline{\text{CLOCK}}$ pulse from line 12. If no triple input NOR gates are available for use as element 47, this function, i.e., that of a triple input NOR gate, can be simulated with two dual input NOR gates and an inverter in series. Operation is the same as a three-input NOR gate, except additional pulse delays are encountered; and a consequent reduction in maximum frequency of operation is experienced.

Figures 4A, 4B:
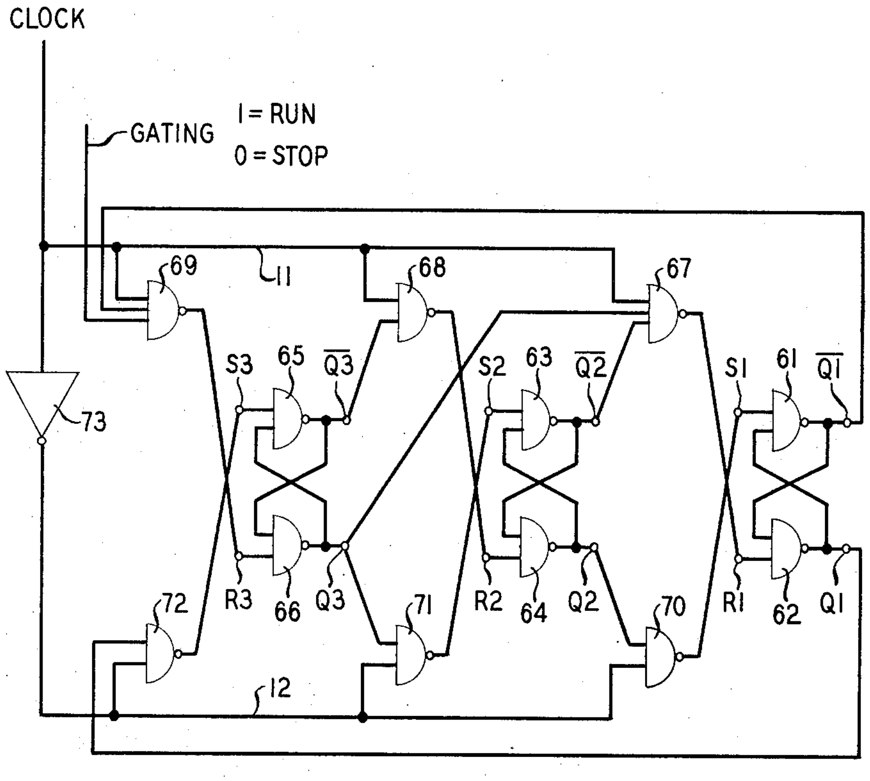
FIG. 4A is a three-phase control signal generator of the type depicted in FIG. 2A, but specifically including NAND gates for the flip-flops and the controllable switches.
FIG. 4B is a truth table for a NAND gate flip-flop.

With reference now to FIG. 4A, there is shown a similar three-phase control signal generator of the type depicted in FIG. 2A. However, the circuit of FIG. 4A is comprised specifically of NAND gates for the flip-flops and the controllable switches. As is known, in a NAND gate a logical "zero" at any input forces the output to be a "one." Because of this characteristic, a flip-flop comprised of simply cross-connected NAND gates has the truth table as indicated in FIG. 4B, where, as in the above descriptions, R and S are the reset and set inputs, respectively, and Q and $\overline{Q}$ are the output and its logical complement, respectively.

It should be noted that, analogous with the simple flip-flop of FIG. 2B, a simple flip-flop comprised only of simply cross-connected NAND gates produces outputs Q and $\overline{Q}$ which are not truly complementary for all possible input combinations because logical "zeros" on both inputs force both outputs to be "one." Also, logical "ones" on both inputs do not produce a unique, predeterminable output. Rather, logical "ones" on both inputs of the flip-flop produce an output which depends on the immediately preexisting state (history) of the flip-flop.

As seen in FIG. 4A, the generator includes a first pair of simply cross-connected NAND gates 61 and 62 comprising flip-flop FF1 having inputs S1 and R1 and outputs Q1 and $\overline{Q1}$. A second pair of simply cross-connected NAND gates 63 and 64 comprise the flip-flop FF2 having inputs S2 and R2 and outputs Q2 and $\overline{Q2}$. A third pair of simply cross-connected NAND gates 65 and 66 comprise flip-flop FF3 having set and reset inputs S3 and R3 and outputs Q3 and $\overline{Q3}$. A plurality of NAND gates 67–69 each have an input connected to a common CLOCK line 11 and provide the function of switches G1–G3 in FIG. 2A. Similarly, a second plurality of NAND gates 70–72 each have an input connected to a common $\overline{\text{CLOCK}}$ line 12 and provide the function of controllable switches G4–G6 in FIG. 2A. Element 73, between CLOCK line 11 and $\overline{\text{CLOCK}}$ line 12, operates simply as an inverter to produce the $\overline{\text{CLOCK}}$ signals.

In operation, NAND gates 67–69 and 70–72 function as closed, inverting switches when the CLOCK or $\overline{\text{CLOCK}}$ line, respectively, coupled thereto, is at a high level. This is in contradistinction to NOR gates 47–52 which operate as closed, inverting switches when the CLOCK or $\overline{\text{CLOCK}}$ line coupled thereto is at a low level. Because of this difference, the two groups of gates 67–69 and 70–72 have been relocated as compared to NOR gates 47–52 in FIG. 3 to match their functions in FIG. 4A with the analogous functions in the block diagram of FIG. 2A and the sequence of states indicated in FIG. 2D.

Triple input NAND gate 67, in addition to operating as the controllable switch analogous to G1 in FIG. 2A, is seen to have a third input connected to output Q3 of FF3. This connection provides feedback sufficient to prevent the circuit from falling into the undesired sequence of states illustrated in FIG. 2D. It does so, as indicated by arrow 39, between rectangles 27 and 24 in FIG. 2D because, due to the characteristics of a NAND gate, a "zero" at output Q3 produces a "one" at the output of NAND gate 67 when CLOCK line 11 is at a high or pulsed level, thereby placing a "one" at input R1 of FF1 and thereby leaving the state of FF1 unchanged. Further analysis shows that the generator of FIG. 4A then goes into the state indicated in rectangle 24 of FIG. 2D.

Finally, an additional feature of the generator of FIG. 4A is the inclusion of triple input NAND gate 69. The third input of NAND gate 69 is shown coupled to a "GATING" input, its function being to ensure that the generator stops in a predeterminable state. In operation, a "one" on the "GATING" input produces no effect on the operation of the generator. However, a "zero" on the "GATING" input prevents a clock pulse on line 11 from switching Q3 to a high level during what would otherwise be a transition from the state represented in rectangle 23 to the state represented in rectangle 24 in FIG. 2D. Consequently, when CLOCK line 11 returns to a low level, Q2 is left at a high level as indicated in rectangle 23; and Q1 and Q3 are at a low level. Only after the "GATING" input has been set to a logical "one" can the next clock pulse on CLOCK line 11 enable the switching of Q3 of FF3 to a "one," whereafter the normal switching sequence continues.

It will be appreciated that stopping the generator in the state indicated in rectangle 23 of FIG. 2D is desirable in operating a three-phase charge coupled device, as such state represents the integration or storage mode for a charge coupled device. As such, it is readily seen that, with the inclusion of the "GATING" capability introduced by triple input NAND gate 69 in FIG. 4A, the charge coupled device is readily switched from a read-out or normal operating transfer mode into an integration or storage mode simply by allowing the clock to run and applying the "zero" pulse on the "GATING" input of NAND gate 69.

Although the invention has been described in detail with reference to certain specific embodiments, it will be apparent that various modifications and variations may be employed by those skilled in the art. All such variations, of course, which basically rely on the teachings through which this description has advanced in the art are properly considered within the scope of this invention. For example, it will be appreciated that other types of flip-flops and other types of logic gates may be employed in the apparatus of this invention. Of course, AND gates and/or OR gates readily can be used for controllable switches G1–G6 in FIG. 2A. The particular gates and types of gates which have been described in detail were selected principally because they are readily available commercially in convenient form.

Further, it will be appreciated that the principles of this invention are not limited to three-phase control signal generators, but rather are readily extendible to two-phase, if desired, and to four- or more phase apparatus, simply by including an additional flip-flop stage for each phase to be employed, additional pairs of controllable switches coupled respectively to the CLOCK and CLOCK pulses, and, if desired, additional feedback to prevent the apparatus from falling into undesired sequences of states such as those illustrated above from which it cannot recover.

What is claimed is:

1. Apparatus for generating multiple-phase control signals comprising:

a plurality of bistable means connected into a closed cascade, each bistable means having first and second input means and first and second output means representative of the logic state and the complement of the logic state of the bistable means;

a first plurality of switches, separate ones coupling signals representative of the logic state of each bistable means to an input of the succeeding bistable means;

a second plurality of switches, separate ones coupling signals representative of the complement of the logic state of each bistable means to the other input of the succeeding bistable means;

means for receiving a one-phase clock signal from an independent source; and means for maintaining conductive the switches of the first plurality in response only to a pulse in the clock signal and for maintaining conductive the switches of the second plurality in response only to the absence of a pulse in the clock signal.

2. Apparatus as recited in claim 1 wherein:

the first and second input means included in each bistable means are, respectively, set and reset input means;

the switches of the second plurality are coupled to the set inputs of the bistable means; and the switches of the first plurality are coupled to the reset inputs of the bistable means.

3. Apparatus as recited in claim 1 wherein the means for receiving the one-phase clock signals includes:

a first conduction path coupled to the switches of the first plurality;

a second conduction path coupled to the switches of the second plurality; and logically inverting means coupled between the first and second conduction paths.

4. Apparatus as recited in claim 3 wherein:

the switches of the first plurality include logic gates each having a first input coupled to an output means of a preceding bistable means, a second input means coupled to the first conduction path, and an output means coupled to an input means of a succeeding bistable means in the cascade; and the switches of the second plurality include logic gates each having a first input coupled to the other output means of the preceding bistable means, a second input coupled to the second conduction path, and an output coupled to the other input means of the succeeding bistable means in the cascade.

5. Apparatus as recited in claim 4 wherein the logic gates in the switches of the first and second pluralities are logically inverting; and the first and second input means included in each bistable means are, respectively, set and reset input means.

6. Apparatus as recited in claim 5 wherein:

separate ones of the first plurality of logic gates are connected between the second output means of a preceding bistable means and the reset input means of a succeeding bistable means; and separate ones of the second plurality of logic gates are connected between the first output means of the preceding bistable means and the set input means of the succeeding bistable means.

7. Apparatus for generating multiple-phase control signals comprising:

a cascaded plurality of bistable means connected into a closed cascade, each bistable means having set and reset input means for selectively setting and resetting the state thereof, and each bistable means additionally having first and second output means representative of the logic state and the complement of the logic state of the bistable means;

first and second pluralities of switches, separate ones of said pluralities coupling an output of one bistable means to an input of the succeeding bistable means in the cascade;

separate ones of the switches of the first plurality coupling the complement of the logic state of each bistable means to the set input means of the succeeding bistable means in the cascade;

separate ones of the switches of the second plurality coupling the logic state of each bistable means to the reset input of the succeeding bistable means in the cascade;

means for receiving a one-phase clock signal from an independent source and for generating the logical complement of said clock signal;

means coupling the clock signal in common to the first plurality of switches and responsive to pulses in the clock signal for simultaneously closing the switches of the first plurality; and means coupling the complement of the clock signal in common to the second plurality of switches and responsive to the pulses in the complement of the clock signal for simultaneously closing said switches of the second plurality.

8. Apparatus as recited in claim 7 wherein: the plurality of bistable means includes first, second, and third bistable means; the first plurality of switches includes three switches; and the second plurality of switches includes three switches; and the apparatus further includes feedback means adapted to prevent the first bistable means from changing state upon arrival of a clock pulse if at that time a "zero" is stored in the third bistable means.

* * * * *